United States Patent [19]

Stanger et al.

[11] Patent Number: 5,994,457
[45] Date of Patent: Nov. 30, 1999

[54] PREPARATION OF AN AQUEOUS POLYMER DISPERSION

[75] Inventors: Bernd Stanger, Dudenhofen; Peter Keller, Hirschberg; Jürgen Hartmann, Frankenthal; Chung-Ji Tschang, Bad Dürkheim, all of Germany

[73] Assignee: BASF Aktiengesellschaft, Ludwigshafen, Germany

[21] Appl. No.: 08/737,933

[22] PCT Filed: Feb. 22, 1995

[86] PCT No.: PCT/EP95/00607

§ 371 Date: Feb. 28, 1997

§ 102(e) Date: Feb. 28, 1997

[87] PCT Pub. No.: WO95/33775

PCT Pub. Date: Dec. 14, 1995

[30] Foreign Application Priority Data

Jun. 3, 1994 [DE] Germany ............. 44 19 518
Oct. 4, 1994 [DE] Germany ............. 44 35 423

[51] Int. Cl.$^6$ ............... C08L 29/00; C08F 2/22
[52] U.S. Cl. .......... 524/800; 524/801; 524/802; 524/804; 524/832; 524/845
[58] Field of Search .............. 524/800, 802, 524/804, 832, 845, 801

[56] References Cited

U.S. PATENT DOCUMENTS

| 2,656,334 | 10/1953 | D'Alelio . |
| 2,716,107 | 8/1955 | Brown . |
| 4,241,203 | 12/1980 | Wenzel ................. 526/218 |
| 4,360,632 | 11/1982 | Pinschmidt, Jr. .......... 524/819 |
| 5,087,676 | 2/1992 | Heider ................... 526/93 |
| 5,268,437 | 12/1993 | Holy .................... 526/229 |

FOREIGN PATENT DOCUMENTS

| 0 505 163 A1 | 9/1992 | European Pat. Off. . |
| 0 327 006 B1 | 1/1993 | European Pat. Off. . |
| 0 584 458 A3 | 2/1994 | European Pat. Off. . |
| 38 34 734 A1 | 4/1990 | Germany . |

OTHER PUBLICATIONS

Badran, Yehia et al.: Study of the Parameters Affecting the Emulsion Polymerization of Vinyl Acetate, Acta Polymerica 41 (1990) Nr. 3.

M.M.H. Ayoub, et al.: Emulsion Polymerization of Vinyl Propionate Using a Newly Developed Redox Pair Initiation System, Polymer vol. 35 No. 13 (1994).

A.S. Badran, et al.: Emulsion Polymerization of Vinyl Acetate Initiated by Potassium Persulfate–Cyclohexanone Sodium Bisulfite Redox Pair System, Journal of Polymer Science: Part A: Polymer Chemistry, vol. 28, 411–424 (1990).

M.A. ABD El–Ghaffar, et al.: Preparation and Evaluation of Some Homo and Copolymeric Emulsions for Latex Paint Applications, Journal of Elastomers and Plastics, vol. 24 Jul. (1992).

*Primary Examiner*—Fred Zitomer
*Attorney, Agent, or Firm*—Oblon, Spivak, McClelland, Maier & Neustadt, P.C.

[57] ABSTRACT

Described is a method of producing an aqueous polymer dispersion, the method calling for further polymerization of the dispersion using a radical mechanism redox initiator system including as the reducing agent the addition compound obtained between a lower ketone and hydrogen sulphite.

56 Claims, No Drawings

PREPARATION OF AN AQUEOUS POLYMER DISPERSION

BACKGROUND OF THE INVENTION

1. Field of the Invention

The present invention relates to a process for the preparation of an aqueous polymer dispersion, in which an aqueous dispersion of a polymer which contains at least two monomers A and B which differ from one another, have at least one ethylenically unsaturated group and are incorporated in chemically bonded form is produced, in a manner known per se, so that the total content of monomers which are free, ie. not chemically bonded, and have at least one ethylenically unsaturated double bond (referred to in this publication as content of residual monomers or residual monomer content) in the aqueous polymer dispersion is from >0 to ≦1% by weight, based on the aqueous polymer dispersion, and this residual monomer content is then reduced by the action of a free radical redox initiator system comprising at least one oxidizing agent and at least one reducing agent.

The present invention furthermore relates to aqueous polymer dispersions resulting when such a procedure is used.

2. Discussion of the Background

Aqueous polymer dispersions are systems which contain polymer particles in disperse distribution as the disperse phase in an aqueous dispersing medium.

As in the case of polymer solutions when the solvent is evaporated, aqueous polymer dispersions have the property of forming polymer films when the aqueous dispersing medium is evaporated, and aqueous polymer dispersions are therefore widely used as binders, for example for surface coatings or for materials for coating leather.

In principle, a person skilled in the art classifies aqueous polymer dispersions as aqueous secondary dispersions and aqueous primary dispersions. The aqueous secondary dispersions are those in the preparation of which the polymer is produced outside the dispersing medium, for example is present in solution in a suitable nonaqueous solvent. This solution is then transferred to the aqueous dispersing medium, and the solvent is separated off, as a rule by distillation, while dispersing is effected. In contrast, aqueous primary dispersions are those in which the polymer is produced in the aqueous dispersing medium itself, directly as the disperse phase.

The common feature of all preparation processes is essentially that monomers which have at least one ethylenically unsaturated group are used for the synthesis of the polymer, or that this synthesis is effected exclusively from such monomers. The incorporation of such monomers having at least one ethylenically unsaturated group is usually carried out by an initiated polymerization reaction, the type of initiation used being determined in particular by the desired performance characteristics of the end product and therefore being adapted to these. For example, ionic or free radical initiation is suitable. However, the incorporation may also be effected by catalytically initiated polymeranalogous reaction. Free radical initiation is particularly frequently used, and the incorporation of the monomers having at least one ethylenically unsaturated group is therefore carried out as a rule by the free radical aqueous emulsion or suspension polymerization method in the case of aqueous primary dispersions and as a rule by the free radical solution polymerization method in the case of aqueous secondary dispersions.

As it is generally uneconomical to attempt to achieve complete conversion while maintaining the actual polymerization reaction conditions which determine the desired properties of the end product, in relation to the incorporation of the monomers having at least one ethylenically unsaturated group, the aqueous polymer dispersions resulting after the end of this main polymerization reaction usually contain free monomers which are not incorporated and have at least one ethylenically unsaturated double bond (this is the case in particular when monomers such as acrylic acid, methacrylic acid or the amides thereof are involved, said monomers having high water solubility). Owing to the high reactivity of the ethylenically unsaturated double bond, such residual monomers are not toxicologically safe and are therefore undesired both by the producer and by the user.

There are in principle already various methods for reducing the residual monomer content of aqueous polymer dispersions.

EP-A 584 458 discloses, for example, the reduction of the residual monomer content of aqueous polymer dispersions by stripping by means of steam.

DE-A 38 34 734 recommends reducing the content of residual monomers in aqueous polymer dispersions by means of the action, after the end of the main polymerization reaction, of a free radical redox initiator system which is less suitable for initiation of main polymerization reactions, for example from the point of view of the usually desired performance characteristics and economical polymerization conditions, hydroxymethanesulfinic acid or the salts thereof being recommended in particular as the reducing agent to be used.

By means of these methods recommended in the prior art for reducing the residual monomer content of aqueous polymer dispersions, residual monomer contents of 1% by weight, based on the aqueous polymer dispersion, can usually be achieved regularly and without great difficulties. By means of these methods, it is of course also possible to achieve residual monomer contents of less than 1% by weight, based on the aqueous polymer emulsion.

Below the 1% by weight limit, however, increasing difficulties are encountered in reducing the residual monomer content when the residual monomers are composed of at least two monomers A and B which differ from one another, since this difference in the residual monomers generally also results in different solubilities thereof both in the aqueous dispersing medium and in the dispersed polymer particles. For different residual monomers A and B, this usually leads to different distribution equilibria between the two phases of an aqueous polymer dispersion, with the consequence that, when the known processes are used for reducing the residual monomer content, the reduction in the contents of the different residual monomers does not take place uniformly, this effect becoming increasingly significant below the abovementioned 1% by weight limit. This means that the method used for the reduction either preferably affects residual monomers which are preferably present in the aqueous dispersing medium or preferably affects those residual monomers which are preferably present in the dispersed polymer particles.

SUMMARY OF THE INVENTION

It is an object of the present invention to provide a process for reducing the residual monomer content, consisting of at least two residual monomers A and B which differ from one another, in an aqueous polymer emulsion whose residual monomer content is from >0 to ≦1% by weight, based on the aqueous polymer emulsion, which process effects a more uniform reduction than the prior art processes with regard to the two or more residual monomers which differ from one another.

We have found that this object is achieved by a process for the preparation of an aqueous polymer dispersion, in which an aqueous dispersion of a polymer which contains at least two monomers A and B which differ from one another, have at least one ethylenically unsaturated group and are incorporated in chemically bonded form is produced, in a manner known per se, so that the total content of monomers which are free, ie. not chemically bonded, and have at least one ethylenically unsaturated double bond in the aqueous polymer dispersion is from >0 to ≦1% by weight, based on the aqueous polymer emulsion, and this residual monomer content is then reduced by the action of a free radical redox initiator system comprising at least one oxidizing agent and at least one reducing agent, wherein the redox initiator system comprises, as the reducing agent, the adduct of a ketone of 3 to 8 carbon atoms with the bisulfite ion $HSO_3^-$, the conjugated acid of this adduct (ie. the adduct of the ketone with sulfurous acid $H_2SO_3$) or a mixture of the stated adducts. The novel process can of course also be used for residual monomer contents of from $10^{-3}$ to 0.5% by weight or from $10^{-3}$ to 0.1% by weight.

DETAILED DESCRIPTION OF THE PREFERRED EMBODIMENTS

The following prior art may be used as a basis for achieving the object of the present invention. A study of the kinetics of free radical aqueous emulsion polymers of vinyl acetate, initiated with a free radical redox initiator system comprising potassium persulfate and acetone sodium bisulfite is published in Acta. Polymerica 41 (1990) No. 3, 187 et seq. Polymer 35 (13) (1994), 2859–2861 relates to a corresponding kinetic study for vinyl propionate, J. Polym. Sci.: Part A: Polymer Chemistry 28 (1990), 411–424, relates to the free radical aqueous emulsion polymerization of vinyl acetate, initiated with a free radical redox initiator system comprising potassium persulfate and cyclohexanone sodium bisulfite. In contrast to the novel process, the stated prior art processes relate only to a monomer having at least one ethylenically unsaturated group.

Journal of Elastomers and Plastics 24 (July 1992), 192 et seq. discloses the free radical aqueous emulsion polymerization of monomer mixtures which consist of vinyl acetate and n-butyl acrylate and contain at least 50 mol % of vinyl acetate, initiation being effected with potassium persulfate and acetone sodium bisulfite as the free radical redox initiator system. As in the case of the processes of the abovementioned prior art, here too the total amount of the polymerization batch was initially taken in the polymerization vessel before the beginning of the free radical aqueous emulsion polymerization.

In all embodiments, the resulting aqueous polymer dispersions contain more than 1% by weight of unpolymerized monomers.

DE-A 32 39 212 recommends the use of a ketone bisulfite as free radical redox initiator systems comprising a reducing agent for the preparation of aqueous primary dispersions by the free radical aqueous emulsion polymerization method. The embodiments are restricted to aqueous vinyl acetate/ethylene copolymer dispersions which contain minor amounts of acrylic acid as polymerized units.

This means that, as in the case of the abovementioned prior art, here too the recommendation of the use of ketone bisulfite as free radical redox initiator systems comprising a reducing agent is restricted essentially to carrying out a main polymerization reaction of monomers comprising vinyl acetate as the main monomer and having at least one ethylenically unsaturated group. In all embodiments of DE-A 32 39 212, this main polymerization reaction terminates at total residual monomer contents substantially above 1% by weight, based on the resulting aqueous polymer dispersions, and residual acrylic acid contents of >1000 mg/kg of dispersion, here too at least 90% by weight of the monomers to be subjected to free radical polymerization being initially taken in the polymerization vessel before the beginning of the free radical aqueous emulsion polymerization. U.S. Pat. No. 2,716,107 discloses, in Example V, the free radical aqueous emulsion polymerization of a monomer mixture consisting of butadiene and styrene, in the presence of a free radical redox initiator system comprising an acetone sodium bisulfite. The polymerization conversion achieved is only 55%.

An important difference between the novel process and the processes of the stated prior art is thus essentially the fact that the novel process in the main only starts where the processes of the relevant prior art end, ie. at the end of the main polymerization reaction.

It should once again be stated at this point that the nature of the polymer dispersed in the aqueous medium plays essentially no role with regard to the success of the novel process, ie. the term polymer here covers both polycondensates, for example polyesters, and polyadducts, such as polyurethanes and polymers which are obtainable by ionic or free radical polymerization of exclusively monomers having at least one ethylenically unsaturated double bond, and mixed variants of the stated types. It is essential only that at least two monomers A and B which differ from one another and have at least one ethylenically unsaturated group are involved in the synthesis of the polymer dispersed in the aqueous medium, in order for a problem of residual monomer removal to exist at all. According to the invention, the manner in which said monomers are incorporated is unimportant. They can be incorporated directly by ionic or free radical polymerization, by polymer-analogous reactions or by direct polyaddition or poly-condensation. Furthermore, it should once again be stated that the terminology aqueous polymer dispersion without further addition covers both aqueous primary dispersions and aqueous secondary dispersions in this publication.

The preparation of aqueous polymer dispersions of the abovementioned different polymer types have been widely described and it is therefore sufficiently well known to a person skilled in the art (cf. for example Encyclopedia of Polymer Science and Engineering, Vol. 8, page 659 et seq. (1987); D.C. Blackley in High Polymer Latices, Vol. 1, page 35 et seq. (1966); H. Warson, The Applications of Synthetic Resin Emulsions, page 246 et seq., Chapter 5 (1972); D. Diederich, Chemie in unserer Zeit 24 (1990), 135–142; Emulsion Polymerization, Interscience Publishers, New York (1965); DE-A 40 03 422 and Dispersionen synthetischer Hoch-polymerer, F. Hölscher, Springer-Verlag, Berlin (1969).

Monomers having at least one monoethylenically unsaturated group which are suitable for the novel process include in particular monomers which can be subjected to free radical polymerization in a simple manner, such as the olefins, eg. ethylene, vinyl aromatic monomers, such as styrene, α-methylstyrene, o-chlorostyrene or vinyl toluenes, esters of vinyl alcohol and monocarboxylic acids of 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids, preferably of 3 to 6 carbon atoms, in particular acrylic acid, methacrylic acid, maleic acid, fumaric acid and itaconic acid, with alkanols of in general 1 to 12, preferably 1 to 8 and in particular 1 to 4 carbon atoms, in particular methyl, ethyl, n-butyl, isobutyl and 2-ethylhexyl acrylate and methacrylate, dimethyl maleate or n-butyl maleate, nitrites of α,β-monoethylenically unsaturated carboxylic acids, such as acrylonitrile, and conjugated $C_4$–$C_8$-dienes, such as 1,3-butadiene and isoprene. In the case of aqueous polymer dispersions produced exclusively by the free radical aqueous emulsion polymerization method, the stated monomers form as a rule the main monomers, which together usually account for more than 50% by weight, based on the total amount of the monomers to be polymerized by the free radical aqueous dispersion polymerization process. As a rule, these monomers have only a moderate to low solubility in water under standard temperature and pressure conditions (25° C., 1 atm).

Monomers which have high water solubility under the abovementioned conditions are, for example, α,β-monoethylenically unsaturated mono- and dicarboxylic acids and the amides thereof, such as acrylic acid, methacrylic acid, maleic acid, fumaric acid, itaconic acid, acrylamide and methacrylamide, and vinyl-sulfonic acid and the water-soluble salts thereof and N-vinyl-pyrrolidone.

In the case of aqueous polymer dispersions produced exclusively by the free radical aqueous emulsion polymerization method, the abovementioned monomers having high water solubility are usually polymerized only as modifying monomers in amounts of less than 50, as a rule from 0.5 to 20, preferably from 1 to 10, % by weight, based on the total amount of the monomers to be polymerized.

Monomers which usually increase the internal strength of the films of the aqueous polymer dispersions usually have at least one epoxy, hydroxy, N-methylol or carbonyl group or at least two nonconjugated ethylenically unsaturated double bonds. Examples of these are N-alkylolamides of α,β-monoethylenically unsaturated carboxylic acids of 3 to 10 carbon atoms and the esters thereof with alkenols of 1 to 4 carbon atoms, among which N-methylolacrylamide and N-methylolmethacrylamide are very particularly preferred, monomers having two vinyl radicals, monomers having two vinylidene radicals and monomers having two alkenyl radicals. The diesters of dihydric alcohols with α,β-monoethylenically unsaturated monocarboxylic acids, preferably acrylic and methacrylic acid, are particularly advantageous. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylates and propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. The $C_1$–$C_8$-hydroxyalkyl esters of methacrylic and acrylic acid, such as n-hydroxyethyl, n-hydroxypropyl or n-hydroxybutyl acrylate and methacrylate, and compounds such as diacetone-acrylamide and acetylacetoxyethyl acrylate and methacrylate are also particularly important in this context. In the case of aqueous polymer dispersions produced exclusively by the free radical aqueous emulsion polymerization method, the abovementioned monomers are generally incorporated by polymerization in amounts of from 0.5 to 10% by weight, based on the total amount of monomers to be polymerized.

The advantages of the novel process are displayed in particular when the residual monomers to be eliminated comprise more than two monomers which differ from one another and have at least one ethylenically unsaturated group, ie. its use proves advantageous when three, four, five, six or more residual monomers which differ from one another are part of the aqueous polymer dispersion to be treated according to the invention.

This is true particularly when the residual monomers present in the aqueous polymer dispersion are such that they have molar solubilities S in 1000 g of water (=molal solubility in water) which differ significantly from one another under the postpolymerization conditions, preferably about 55° C. and about 1 bar (as a rule, these solubilities are essentially about the same as those at 25° C. and 1 bar).

If, in a residual monomer mixture, the residual monomer which has the highest molal solubility $S_A$ is denoted by A and the residual monomer which has the lowest molal solubility $S_B$ is denoted by B, the success according to the invention is essentially independent of whether the ratio $S_A/S_B$ is $\geq 1.1$ or $\geq 1.5$ or $\geq 2$ or $\geq 5$ or $\geq 10$ or $\geq 50$ or $\geq 100$ or $\geq 1000$.

This means that the success according to the invention is achieved, as a rule, if the residual monomers contain at least one residual monomer which was assigned to the group consisting of the moderately to slightly water-soluble monomers in the above list and at least one residual monomer which was assigned to the group having high water solubility in the corresponding list.

The success according to the invention is also achieved in particular when the residual monomer mixture contains at least one of the monomers styrene, butadiene, n-butyl acrylate and 2-ethyl-hexyl acrylate, which have particularly poor solubility in water, and at least one of the monomers acrylic acid, methacrylic acid, acrylamide and methacrylamide, which are particularly readily soluble in water. However, even if the residual monomer mixture already contains moderately water-soluble monomers, such as methyl methacrylate, vinyl acetate and/or acrylonitrile, in addition to at least one of the abovementioned monomers defined as being particularly readily soluble, the novel process is to be recommended.

Particularly noteworthy is the reduction in the residual acrylonitrile content which can be completely satisfactorily achieved when the novel process is used, since the elimination of acrylonitrile is considered very generally to be difficult.

Very particularly noteworthy, however, is the fact that the novel process for the removal of residual monomers in aqueous polymer emulsions also completely eliminates acrylic acid, and that the acrylic acid content is particularly efficiently reduced when acrylonitrile is simultaneously present as a further residual monomer. Thus, it has not been possible to date, by means of the prior art processes for reducing the residual monomer content in aqueous polymer dispersions, to achieve residual acrylic acid monomer contents of less than 100 or 50, to say nothing of less than 40 or less than 25 or even less than 10, mg of acrylic acid per kg of aqueous polymer dispersion.

A corresponding reduction in the acrylic acid content by stripping by means of steam would be possible in theory but would not be realizable in practice owing to the extreme time and steam requirements for this purpose, and the processes recommended to date for the postpolymerization by the action of free radical initiator systems cope with essentially either only the acrylic acid dissolved in the aqueous phase or only the acrylic acid dissolved in the polymer or, depending on the amount which has to be used, produce a very wide range of secondary products in amounts which cause damage to the aqueous polymer emulsion.

In comparison, and without a claim to validity, the advantageous nature of the novel process is due to the fact that the adduct of a lower ketone with the bisulfite ion, which adduct is to be used as a reducing agent, possesses amphiphilic character, ie. it has both lipophilic and hydrophilic properties. The low surface charge density of the adduct anion is also likely to be particularly important. Presumably, corresponding amphiphilic radicals form from the abovementioned adducts in the course of the novel process and are then capable of penetrating both into the polymer phase and into the aqueous phase. This means that, in contrast to the prior art processes, the novel procedure thus presumably affects both the part of the residual monomers which is present in the aqueous dispersing medium (ie. in particular those residual monomers having a higher water solubility) and the part of the residual monomers which remains in the polymer particles (ie. particularly those residual monomers having low water solubility).

The fact that both possible monomer-containing phases are affected is of course also advantageous with regard to the reduction of an individual monomer type and is likely to be responsible for the remarkably effective acrylic acid reduction to be achieved according to the invention.

The secondary products formed during the consumption, in the reduction, of the adducts to be used according to the invention furthermore reduce the quality (in particular the stability) of the aqueous polymer dispersion, at least to a small extent. This also opens up the possibility of simultaneously using the novel process and the stability-impairing stripping process.

A further advantage of the novel process is that, for example in contrast to the residual monomer elimination by stripping by means of steam, it can be used without difficulties essentially independently of the solids volume content, the solids volume being based on the volume of the polymer dispersion in the aqueous polymer dispersion. This means that the solids volume content may be from 10 to 50, from 20 to 60 or from 30 to 70, % by volume, as is the case, for example, in the aqueous polymer dispersions of DE-A 42 13 965.

Aqueous polymer dispersions whose dispersed polymer contains chemically bonded acrylic acid monomer are important in a very wide range of applications, and the problem of reducing the residual acrylic acid monomer content is therefore particularly vital.

Frequently, acrylic acid is incorporated in addition to other monomers having at least one ethylenically unsaturated group into the disperse polymer in order alone or concomitantly to stabilize the dispersion thereof in the aqueous dispersing medium. In these cases, the content of incorporated acrylic acid is as a rule from 0.1 to 5, preferably from 0.5 to 4, % by weight, based on the dispersed polymer. Just as the stabilizing effect of the acrylic acid is based on its property of forming carboxylate ions on dissociation, its influence on the rheology of aqueous polymer dispersions is also based on this property. The last-mentioned effect is particularly significant when the content of acrylic acid incorporated in the polymer is from $\geq 5$ to 60% by weight, based on the polymer. If the pH of aqueous dispersions of polymers having the abovementioned acrylic acid content is increased, their dynamic viscosity increases considerably. Such aqueous polymer dispersions are therefore advantageously used as thickener dispersions (cf. for example German Patents 1,164,095, 1,264,945, 1,258,721, 1,546,315 and 1,265,752). In this context, they are produced in an acidic medium with relatively low viscosity. The thickening effect is brought about only when the user increases the pH. This is one of the cases where the reduction of the residual monomer content is to be carried out by the producer of the aqueous polymer emulsion at a pH of the aqueous dispersing medium of less than 7. Other such cases occur when the dispersed polymer contains N-alkylol groups, eg. N-methylol groups, which are capable of undergoing condensation reactions leading to crosslinking during film formation of the aqueous polymer dispersion at acidic pH (cf. German Patent 4,040,959 and EP-A 147 759).

From this point of view, it is particularly advantageous that the novel process can be used for eliminating residual monomers both in the alkaline and in the acidic pH range, ie. at a pH of the aqueous dispersing medium of from 1 to 12, preferably from 2 to <7, particularly preferably from 2 to 6, the procedure at a pH of from 2 to 5 being very particularly advisable. Carrying out the novel reduction of the residual monomer content in an acidic aqueous medium is also advantageous in that the redox potential of the free radical redox initiators to be used according to the invention usually has a higher value in the acidic pH range, usually resulting in a high yield of free radicals.

With regard to the temperatures to be used in the novel reduction of the residual monomer content, the range from 0 to 100° C., preferably from 20 to 100° C., is recommended.

As the reaction temperature increases, there is an increasing danger of decomposition of the adduct concomitantly to be used as a reducing agent and of volatilization of the ketone components. At about 100° C. and above this temperature, a novel process is therefore preferably carried out in an autoclave. The particularly preferred temperature range is from 20 to 65° C., very particularly preferably from 40 to 65° C. Suitable pressures are, for example, from 1 to 15 bar.

As stated above, the novel process is applicable in particular to those aqueous polymer dispersions whose dispersed polymer, without the residual monomer elimination according to the invention, is produced by the free radical aqueous emulsion polymerization method from monomers having at least one ethylenically unsaturated group, and all statements made in this publication therefore relate in particular to those aqueous primary dispersions prepared by the free radical aqueous emulsion polymerization method. The free radical aqueous emulsion polymerization is preferably carried out by the feed method, ie. the predominant amount of the monomers to be polymerized, as a rule from 50 to 100, preferably from 70 to 100, particularly preferably from 80 to 100, very particularly advantageously from 90 to 100, % by weight of the total amount thereof, are added to the polymerization vessel only from the beginning of the free radical aqueous emulsion polymerization at the rate at which the monomers present in the polymerization vessel undergo polymerization. As a rule, the addition is effected by continuous feed (as a rule as pure monomer feed or preemulsified in the aqueous phase) so that at least 80, preferably at least 90, very particularly preferably at least 95, % by weight of the monomers already present in the polymerization vessel are polymerized. In order to establish the particle size of the dispersed polymer particles, aqueous seed polymer dispersions may be concomitantly used (cf. EP-B 40419 and Encyclopedia of Polymer Science and Technology, Vol. 5, John Wiley & Sons Inc., New York (1966), page 847).

Suitable free radical polymerization initiators for the main polymerization reaction described above are all those which are capable of initiating a free radical aqueous emulsion polymerization. These may be both peroxides and azo compounds. However, redox initiator systems are of course also suitable. As a rule, the free radical initiator system used for the main polymerization will differ from the free radical initiator system to be used according to the invention for the postpolymerization. In order to carry out the free radical aqueous emulsion polymerization particularly efficiently as the main polymerization reaction from the point of view of the desired properties and in order to ensure high cost-effectiveness, the use of peroxodisulfuric acid and/or the alkali metal salts thereof and/or its ammonium salt as free radical initiators is preferred. The amount of the free radical initiator systems used is preferably from 0.1 to 2% by weight, based on the total amount of the monomers to be polymerized. The manner in which the free radical initiator system is added to the polymerization vessel in the course of the free radical aqueous main emulsion polymerization described tends to be of minor importance. The initiator system may be either initially taken in its entirety in the polymerization vessel or added continuously or stepwise at the rate at which it is consumed in the course of the free radical aqueous emulsion polymerization. This depends specifically, in a manner known per se to a person skilled in the art, both on the chemical nature of the initiator system and on the polymerization temperature.

A direct consequence of the abovementioned fact is that the total range from 0 to 100° C. is suitable as a reaction temperature for the abovementioned free radical aqueous main emulsion polymerization, but temperatures from 70 to 100° C., preferably from 80 to 100° C., particularly preferably from >85 to 100° C., are preferably used.

It is possible to use superatmospheric or reduced pressure, so that the polymerization temperature may also exceed 100° C. and may be up to 130° C. Readily volatile monomers, such as ethylene, butadiene or vinyl chloride, are preferably polymerized under super-atmospheric pressure. It is of course possible concomitantly to use molecular weight regulators, such as tert-dodecyl mercaptan, in the free radical aqueous emulsion polymerization.

Dispersants which ensure the stability of the aqueous polymer dispersion produced are usually concomitantly used in the free radical aqueous emulsion polymerization. Suitable dispersants are the protective colloids usually used for carrying out free radical aqueous emulsion polymerization and emulsifiers.

Examples of suitable protective colloids are polyvinyl alcohols, cellulose derivatives or copolymers containing vinylpyrrolidone. A detailed description of further suitable protective colloids appears in Houben-weyl, Methoden der organischen Chemie, Volume XIV/1, Makromolekulare Stoffe, Georg-Thieme-Verlag, Stuttgart, 1961, pages 411 to 420. Mixtures of emulsifiers and/or protective colloids can of course also be used. Preferably, exclusively emulsifiers whose relative molecular weights, in contrast to the protective colloids, are usually below 1000 are preferably used as dispersants. They may be anioic, cationic or nonionic. Where mixtures of surfactants are used, the individual components must of course be compatible with one another, which may be checked in a few preliminary experiments in case of doubt. In general, anionic emulsifiers are compatible with one another and with non-ionic emulsifiers. The same also applies to cationic emulsifiers, whereas anionic and cationic emulsifiers are generally incompatible with one another. Conventionally used emulsifiers are, for example, ethoxylated mono-, di- and trialkylphenols (degree of ethoxylation: from 3 to 50, alkyl radical: $C_4$ to $C_9$), ethoxylated fatty alcohols (degree of ethoxylation: from 3 to 50, alkyl radical: $C_8$ to $C_{36}$) and alkali metal and ammonium salts of alkyl sulfates (alkyl radical: $C_8$ to $C_{12}$), of sulfuric half-esters of ethoxylated alkanols (degree of ethoxylation: from 4 to 30, alkyl radical: $C_{12}$ to $C_{18}$) and ethoxylated alkylphenols (degree of ethoxylation: from 3 to 50, alkyl radical: $C_4$ to $C_9$), of alkyl-sulfonic acids (alkyl radical: $C_{12}$ to $C_{18}$) and of alkylaryl-sulfonic acids (alkyl radical: $C_9$ to $C_{18}$). Further suitable emulsifiers are described in Houbel-Weyl, Methoden der organischen Chemie, Volume VIX/1, Makromolekulare Stoffe, Georg-Thieme Verlag, Stuttgart, 1961, pages 192 to 208.

Furthermore, compounds of the general formula I

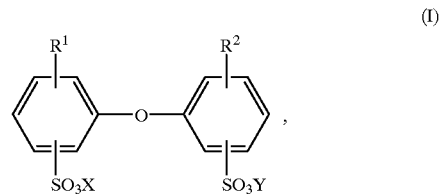

(I)

where $R^1$ and $R^2$ are each hydrogen or $C_4$–$C_{24}$-alkyl and are not simultaneously hydrogen and X and Y may be alkali metal ions and/or ammonium ions, have proven suitable as surfactants. In the formula I, $R^1$ and $R^2$ are each preferably linear or branched alkyl of 6 to 18, in particular 6, 12 or 16, carbon atoms or hydrogen, $R^1$ and $R^2$ not both simultaneously being hydrogen. X and Y are each preferably a sodium, potassium or ammonium ions, sodium being particularly preferred. Particularly advantageous compounds I are those in which X and Y are each sodium, $R^1$ is branched alkyl of 12 carbon atoms and $R^2$ is hydrogen or $R^1$. Industrial mixtures which contain from 50 to 90% by weight of the monoalkylated product, for example Dowfax® 2A1 (trademark of Dow Chemical Company), are frequently used. In the novel process, the compounds I are used as dispersants preferably as such and particularly preferably as a mixture with ethoxylated fatty alcohols (degree of ethoxylation: 3 to 50, alkyl radical: $C_8$ to $C_{36}$). The compounds I are generally known, for example from U.S. Pat. No. 4,269, 749, and are commercially available.

As a rule, the amount of dispersant used is from 1 to 3% by weight, based on the monomers to be subjected to free radical polymerization.

The abovementioned dispersants are of course suitable very generally for stabilizing the direct products according to the invention. However, said products also comprise aqueous polymer dispersions of self-emulsifying polymers, ie. of polymers which have ionic groups which, owing to the repulsion of charges of the same sign, are capable of effecting stabilization. The direct products according to the invention preferably contain anionic dispersants.

If the aqueous polymer dispersion whose residual monomer content is to be reduced in the novel manner is prepared by the free radical aqueous emulsion polymerization method from monomer compositions of monomers having at least one ethylenically unsaturated group, monomer compositions which are particularly important with regard to the novel process are those which comprise at least two monomers which differ from one another and have at least one ethylenically unsaturated group and in addition contain from 70 to 99.9% by weight of esters of acrylic and/or methacrylic acid with alkanols of 1 to 12 carbon atoms and/or styrene or from 70 to 99.9% by weight of styrene and/or butadiene, or from 70 to 99.9% by weight of vinyl chloride and/or vinylidene chloride, or from 40 to 99.9% by weight of vinyl acetate, vinyl propionate and/or ethylene.

Particularly relevant monomer compositions with regard to the novel process are those which comprise:

| | |
|---|---|
| from 0.1 to 5% by weight | of at least one α,β-monoethylenically unsaturated carboxylic acid of 3 to 6 carbon atoms and/or the amide thereof (monomers A) and |
| from 70 to 99.9% by weight | of esters of acrylic and/or methacrylic acid with alkanols of 1 to 12 carbon atoms and/or styrene (monomers B) |
| or | |
| from 0.1 to 5% by weight | of at least one α,β-monoethylenically unsaturated carboxylic acid of 3 to 6 carbon atoms and/or the amide thereof (monomers A) and |
| from 70 to 99.9% by weight | of styrene and/or butadiene (monomers B') |
| or | |
| from 0.1 to 5% by weight | of at least one α,β-monoethylenically unsaturated carboxylic acid of 3 to 6 carbon atoms and/or the amide thereof (monomers A) and |
| from 70 to 99.9% by weight | of vinyl chloride and/or vinylidene chloride (monomers B'') |
| or | |
| from 0.1 to 5% by weight | of at least one α,β-monoethylenically unsaturated carboxylic acid of 3 to 6 carbon atoms and/or the amide thereof (monomers A) and |
| from 40 to 99.9% by weight | of vinyl acetate, vinyl propionate and/or ethylene (B'''). |

The novel process is very particularly relevant in the case of the abovementioned monomer compositions when the monomer A is acrylic acid.

Moreover, the novel process is preferable in the case of free radical aqueous emulsion polymerizations of monomer compositions which comprise:

| | |
|---|---|
| from 0.1 to 30, preferably from 0.5 to 15, % by weight | of acrylonitrile and |
| from 70 to 99.9% by weight | of esters of acrylic and/or methacrylic acid with alkanols of 1 to 12 carbon atoms and/or styrene |
| or | |
| from 0.1 to 30, preferably from 0.5 to 15, % by weight | of acrylonitrile and |
| from 70 to 99.9% by weight | of styrene and/or butadiene |
| or | |
| from 0.1 to 40% by weight | of vinyl acetate and/or vinyl propionate and |
| from 60 to 99.9% by weight | of esters of acrylic and/or methacrylic acid with alkanols of 1 to 12 carbon atoms and/or styrene. |

However, the novel process is very particularly preferable in the case of free radical aqueous emulsion polymerizations of monomer compositions which comprise:

| | |
|---|---|
| from 0.1 to 5% by weight | of at least one α,β-monoethylenically unsaturated carboxylic acid of 3 to 6 carbon atoms and/or the amide thereof, in particular acrylic acid, |
| from 0.1 to 30, preferably from 0.5 to 15, % by weight | of acrylonitrile and |
| from 69.9 to 99.9% by weight | of esters of acrylic and/or methacrylic acid with alkanols of 1 to 12 carbon atoms and/or styrene |
| or | |
| from 0.1 to 5% by weight | of at least one α,β-monoethylenically unsaturated carboxylic acid of 3 to 6 carbon atoms and/or the amide thereof, in particular acrylic acid, |
| from 0.1 to 30, preferably from 0.5 to 15, % by weight | of acrylonitrile and |
| from 69.9 to 99.9% by weight | of styrene and/or butadiene |
| or | |
| from 0.1 to 5% by weight | of at least one α,β-monoethylenically unsaturated carboxylic acid of 3 to 6 carbon atoms and/or the amides thereof, in particular acrylic acid, |
| from 0.1 to 40% by weight | of vinyl acetate and/or vinyl propionate and |
| from 59.9 to 99.9% by weight | of esters of acrylic and/or methacrylic acid with alkanols of 1 to 12 carbon atoms and/or styrene. |

In the case of aqueous polymer dispersions which contain residual monomers and whose dispersed polymer is produced from monomers having at least one ethylenically unsaturated group by free radical aqueous emulsion polymerization, as a rule the residual monomer content reaches or falls below the 1% by weight limit, based on the total aqueous emulsion, in this free radical aqueous main emulsion polymerization itself. Where this is not possible, the novel process for the reduction of the residual monomer content can, as stated above, either be used directly thereafter or the prior art methods known per se for reducing the residual monomer content can first be employed until the abovementioned limit is reached, after which a procedure as continued according to the invention in order to make use of the advantages of the novel process. The transition between the main polymerization reaction and the novel step for reducing the residual monomer content can in general be a smooth one. Furthermore, the novel free radical redox initiator system may already have been concomitantly used in the main polymerization reaction.

The adduct of a lower ketone with the bisulfite anion, which adduct is concomitantly to be used according to the invention as the reducing agent, automatically forms in an aqueous medium which contains both compounds. The formation of the adduct is evident from a negative heat of reaction (exothermic). As a rule, it is not possible to isolate the adduct in pure form from the aqueous medium. The novel reducing agent is therefore usually used in the form of aqueous solutions which contain the lower ketone and a suitable bisulfite source. For example, $SO_2$, alkali metal bisulfites or alkali metal disulfites may be used as the latter. $NaHSO_3$ and $Na_2S_2O_5$ are preferably used. The bisulfite forms from the latter as a result of hydrolysis. The ketone, which as a rule is relatively readily volatile, is advantageously used in a 1.2-fold to 1.5-fold excess, based on the stoichiometry of the reaction (R' and R'' are each an organic radical).

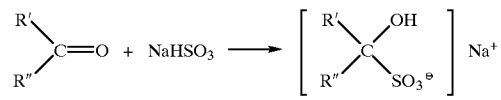

On the one hand, such an excess shifts the position of the equilibrium in favor of the required adduct and, where some of the ketone volatilizes under the conditions of the novel postpolymerization, also ensures that a sufficient adduct content remains in the aqueous system.

Suitable ketones of 3 to 8, preferably 3 to 5, carbon atoms are both aliphatic and cyclic ketones, for example acetone, methyl ethyl ketone, diethyl ketone, acetyl acetone, methyl acetoacetate, cyclohexanone, acetol and 4-hydroxy-4-methyl-2-pentanone, among which acetone, methyl ethyl ketone and diethyl ketone are preferred. Acetone is particularly preferred. The fact that these ketones have a water solubility of at least 1 gram per 1000 grams of water at 25° C. is characteristic of said ketones and essential for the invention.

The free radical redox initiators to be used according to the invention may of course comprise, in addition to the adducts described, other reducing agents, such as reducing sugars, eg. lactose and fructose, derivatives thereof, such as ascorbic acid, or sulfinic acids, such as hydroxymethanesulfinic acid or alkane-sulfinic acids, such as isopropanesulfinic acid. However, the adducts concomitantly to be used according to the invention preferably account for more than 50, particularly preferably more than 75, % by weight of the total amount of reducing agents used and very particularly preferably form the sole reducing agent.

Suitable oxidizing components of the free radical redox initiators to be used according to the invention are, for example, agents which donate oxygen with free radical formation and do not have the peroxide structure, such as alkali metal chlorates and perchlorates, transition metal oxide compounds, such as potassium permanganate, manganese dioxide and lead oxide, as well as lead tetraacetate and iodobenzene. However, peroxides or hydroperoxides or mixtures thereof are preferably used.

Hydrogen peroxide, peroxodisulfuric acid and its salts, in particular as alkali metal salts, pinane hydroperoxide, tert-butyl hydroperoxide, dibenzoyl peroxide and cumol hydroperoxide have proven particularly effective. Tert-butyl hydroperoxide is preferably used exclusively.

Oxidizing agents and reducing agents should as a rule be used in the novel process in a molar ratio from 0.1:1 to 1:0.1, preferably from 0.5:1 to 1:0.5, particularly preferably from 0.75:1 to 1:0.75. They are preferably used in equivalent amounts.

In the novel process, the free radical redox initiator system to be used according to the invention may in principle be added all at once to the aqueous polymer dispersion containing the residual monomers. Advantageously, however, only the oxidizing agent is added all at once and the reducing agent is introduced continuously in the course of a few hours. However, it is very particularly advantageous to add the oxidizing agent and the reducing agent continuously via separate feeds in the course of a few hours to the aqueous polymer dispersion to be treated. As a rule, the two feeds begin and end essentially simultaneously, ie. the feeds are essentially synchronous. The feed is advantageously effected in the form of aqueous solutions.

The amounts in which the free radical redox initiator system to be used according to the invention are to be employed depend of course on the amount of residual monomers still present and on the desired degree of reduction thereof.

As a rule, the amount to be used is from 0.01 to 5, advantageously from 0.1 to 1, % by weight, based on the dispersed polymer. It is of course possible for the novel process to be followed by other processes for reducing the residual monomer content.

It is noteworthy that, in the case of the novel reduction of the residual monomer content, it is not necessary to use the novel redox initiator system in the presence of a metal compound which is soluble in the aqueous reaction medium and whose metallic component (eg. iron, vanadium or a mixture thereof) may occur in a plurality of valency states. However, it may of course also be used in the presence of such a compound. As a rule, it is then used in amounts of from 0.01 to 1% by weight, based on the oxidizing or reducing agent (the component present in less than the stoichiometric amount in each case) and calculated as metal compound to be added. Examples of suitable such compounds are iron(III) sulfate, iron(II) chloride, iron(II) nitrate, iron(II) acetate and the corresponding iron(III) salts, ammonium or alkali metal vanadates (V(V)), vanadium(III) chloride, vanadyl(V) trichloride and in particular vanadyl (IV) sulfate pentahydrate. Complexing agents which keep the metals in solution under the reaction conditions are frequently also added. As in the case of the free radical polymerization processes generally, the novel process too is also carried out as a rule with the exclusion of oxygen.

Finally, it should also be stated that the free radical redox initiator systems to be used according to the invention permit an effective reduction of the residual monomer content in a relatively short time. It is also important that the adduct to be used according to the invention as a reducing agent is advantageously not capable of reducing microcides generally to be added to aqueous polymer dispersions as preservatives, and its use in excess therefore does not impair the quality of the aqueous polymer dispersion in this respect. The residual monomer contents determined in the embodiments below are based on gas chromatographic determinations, with the exception of the determination of the acrylic acid content.

The acrylic acid contents are determined with isocratic elution by means of a buffer pH-stabilized aqueous medium and with the use of column back-washing for regenerating the column, using reversed phase high pressure liquid chromatography with UV detection, the aqueous polymer dispersion to be investigated being diluted by means of water and the main amount of the polymer being precipitated by $BaCl_2/H_2SO_4$ or Carrez precipitation. The liquid supernatent of a sample was investigated, the validation of the procedure being confirmed by the concentration method.

EXAMPLES AND COMPARATIVE EXAMPLES

Example A

A monomer mixture consisting of 50% by weight of styrene, 48% by weight of butadiene, 1.5% by weight of acrylic acid and 0.5% by weight of itaconic acid was polymerized as follows by the free radical aqueous emulsion polymerization method:

A mixture of 264 g of water, 216 g of a finely divided aqueous polystyrene seed dispersion and 2.5 g of itaconic acid was initially taken in a polymerization vessel and heated to 85° C. A mixture of 18.5 g of water and 1.5 g of ammonium peroxide disulfate was then added all at once. Feeds I, II and III were then added continuously in the course of 6 hours, beginning at the same time, while maintaining the polymerization temperature of 85° C.

| | |
|---|---|
| Feed I: | 249 g of styrene |
| | 239 g of butadiene |
| | 8.5 g of tert-dodecyl mercaptan |
| Feed II: | 97 g of water |
| | 1 g of sodium pyrophosphate (pH buffer) |

15
-continued

| | |
|---|---|
| | 7.7 g of acrylic acid |
| | 10.84 g of the sodium salt of the sulfuric half-ester of ethoxylated lauryl alcohol (2 ethylene oxide units) |
| Feed III: | 18.4 g of water |
| | 1.5 g of ammonium peroxodisulfate |

Stirring was then carried out for a further hour at 85° C. The resulting aqueous polymer dispersion had a total residual monomer content of 1.47% by weight, based on said dispersion. Of this, the essentially water-insoluble styrene (solubility=0.07% by weight at 25° C., 1 bar) accounted for 4700 mg/kg of dispersion and the acrylic acid which is infinitely miscible with water at 25° C. and 1 bar accounted for 700 mg/kg of dispersion.

The abovementioned aqueous polymer dispersion containing residual monomers was neutralized to a pH of about 7 by means of aqueous sodium hydroxide solution, after which Feeds IV and V were added continuously in the course of 2 hours at 55° C., beginning at the same time. After the end of the feed, stirring was continued for a further hour at 55° C.

| | |
|---|---|
| Feed IV: | 8.6 g of water |
| | 1.4 g of tert-butyl hydroperoxide |
| Feed V: | 11.5 g of water |
| | 1 g of sodium disulfite (Na$_2$S$_2$O$_5$) |
| | 0.65 g of acetone |

After the end of the novel process, the aqueous polymer dispersion had a total residual monomer content well below 1% by weight, based on said dispersion.

Of this, styrene accounted for 860 mg/kg of dispersion and acrylic acid accounted for 100 mg/kg of dispersion.

Example B

As in Example A, Feed IV contained 2.1 g of tert-butyl hydroperoxide in dissolved form and Feed V contained 1.5 g of sodium disulfite and 0.98 g of acetone. Of the resulting total residual monomer content which was well below 1% by weight, based on the aqueous polymer dispersion, styrene accounted for 170 mg/kg of dispersion and acrylic ester accounted for 20 mg/kg of dispersion.

Example C

As in Example A, except that Feed IV contained 2.8 g of tert-butyl hydroperoxide in dissolved form and Feed V contained 2 g of sodium disulfite and 1.3 g of acetone. Of the resulting total residual monomer content which was well below 1% by weight, based on the aqueous polymer dispersion, styrene accounted for 75 mg/kg of dispersion and acrylic ester accounted for <10 mg/kg of dispersion.

The quality of the resulting aqueous polymer dispersion was not adversely affected.

Comparative Example A

The aqueous polymer dispersion obtained in Example A after carrying out the novel reduction of the residual monomer content was stripped by means of steam in the manner known per se, the styrene content of 860 mg/kg of emulsion decreasing to 115 mg/kg of emulsion while the acrylic acid content remained unchanged at 100 mg/kg of dispersion, within the accuracy of measurement.

Example D

Example A was repeated, except that the reduction in the residual monomer content was carried out without prior neutralization by means of aqueous sodium hydroxide solution. The pH of the aqueous dispersing medium was about 4. The following residual monomer contents resulted:

styrene 417 mg/kg of emulsion acrylic acid 52 mg/kg of emulsion

Athough the aqueous polymerization was stabilized by means of an anionic emulsifier whose stabilizing effect is reduced at pH <7, the use of the novel process for reducing the residual monomer content did not result in any decrease in the quality of the dispersion and in particular there was no formation of microflocs (specks).

Comparative Example B

As in Example D, except that, instead of the novel adduct, Feed V contained an equimolar amount of the sodium salt of hydroxy-methanesulfinic acid in dissolved form. The following residual monomer contents resulted:

styrene 560 mg/kg of dispersion acrylic acid 645 mg/kg of dispersion

No substantial further reduction in the acrylic acid content could be achieved by increasing the active ingredient content in Feeds V and IV. At the same time, however, the quality of the aqueous polymer dispersion deteriorated owing to speck formation.

Example E

Example A was repeated, except that 4% by weight of styrene was replaced by 4% by weight of acrylonitrile. The following residual monomer contents resulted:

styrene: 824 mg/kg of dispersion acrylic acid: 59 mg/kg of dispersion

Example F

As in Example A, except that Feed III contained 3 g of ammonium peroxodisulfate. After the end of the aqueous free radical main emulsion polymerization, the total residual monomer content was 1.17% by weight, based on the aqueous polymer dispersion.

Of this, styrene accounted for 3900 mg/kg of dispersion and acrylic acid accounted for 500 mg/kg of dispersion.

After the end of the novel postpolymerization, the total residual monomer content was well below 1% by weight, based on the aqueous polymer dispersion, of which styrene accounted for 360 mg/kg of dispersion and acrylic acid accounted for 39 mg/kg of dispersion.

Example G

As in Example F, except that Feed IV contained 2.8 g of tert-butyl hydroperoxide and Feed V contained 2 g of sodium disulfite and 1.3 g of acetone. The resulting residual monomer contents were styrene 55 mg/kg of dispersion acrylic acid <10 mg/kg of dispersion.

Example H

As in Example F, except that Feed IV contained 3.5 g of tert-butyl hydroperoxide and Feed V contained 2.5 g of sodium disulfite and 1.6 g of acetone. The resulting residual monomer contents were styrene 19 mg/kg of dispersion acrylic acid <<10 mg/kg of dispersion.

Example I

As in Example D, except that the temperature for the postpolymerization was 85° C., Feed IV contained 1.39 g of ammonium peroxodisulfate instead of 1.4 g of tert-butyl hydroperoxide and Feed V contained only 0.5 g of sodium disulfite and 0.33 g of acetone.

The resulting residual monomer contents were:

styrene 1005 mg/kg of dispersion acrylic acid 56 mg/kg of dispersion.

Example J

A monomer mixture consisting of 49.1% by weight of n-butyl acrylate, 49.1% by weight of vinyl acetate and 1.8% by weight of acrylic acid was polymerized according to the preparation method in "Methoden der organischen Chemie (Houben-weyl), Vol. XIV/1, Makromolekulare Stoffe, Part 1, Georg Thieme Verlag Stuttgart (1961), page 186 (Preparation of Acronal® 500 D)" by free radical aqueous emulsion polymerization, and the mixture was worked up. After the mixture had been cooled to 35° C., the total residual monomer content was about 3.2% by weight, based on the aqueous polymer dispersion, and the pH of the aqueous dispersing medium was 3.5.

Of this, the n-butyl acrylate which is essentially unsoluble in water (solubility=0.14% by weight at 20° C., 1 bar) accounted for 21500 mg/kg of dispersion and the acrylic acid which is infinitely miscible with water at 25° C. and 1 bar accounted for 965 mg/kg of dispersion.

The following feeds I and II were added continuously to 500 g of this aqueous polymer dispersion in the course of 2 hours at 55° C., beginning at the same time:

Feed I: 10 g of water
  1.6 g of tert-butyl hydroperoxide
Feed V[sic] 13.3 g of water
  1.13 g of sodium disulfite
  0.73 g of acetone After the end of the feed, stirring was continued for a further hour at 55° C. The aqueous polymer dispersion then had a total residual monomer content well below 1% by weight, based on said dispersion.

Of this, n-butyl acrylate accounted for 44 mg/kg of dispersion and ac rylic acid accounted for <10 mg/kg of dispersion.

Example K

A monomer mixture consisting of 14% by weight of styrene, 69.2% by weight of n-butyl acrylate, 2.9% by we ight of acrylic acid and 13.9% by wei ght of acrylonitrile was polymerized as follows by the free radical aqueous emulsion polymerization method.

A mixture of 144 g of water and 1.8 g of sodium laurylsulfate was initially taken in a polymerization vessel and heated to 85° C. A solution of 0.26 g of ammonium peroxodisulfate in 5 g of water was then added all at once. Feeds I and II were then added continuously in the course of 6 hours and feed III was added continuously in the course of 6.5 hours, beginning at the same time, while maintaining the temperature of 85° C.

Feed I: 274 g of water
  25 2.4 g of sodium pyrophosphate (pH buffer)
  8.5 g of sodium laurylsulfate
  15.9 g of acrylic acid
  74.3 g of stnyrene
  366 g of n-butyl acrylate
Feed II: 74 g of acrylonitrile
Feed III: 45 g of water
  2.4 g of am monium peroxodisulfate Stirring was then continued for a further hour at 85° C. The resulting aqueous polymer dispersion had a total residual monomer content of <1% by weight, based on said dispersion. Of this, n-butyl acrylate accounted for 5400 mg/kg of dispersion, acrylic acid accounted for 800 mg/kg of dispersion, styrene accounted for 100 mg/kg of dispersion and acrylonitrile (solubility in water at 20° C., 1 bar: 7.35% by weight) accounted for 500 mg/kg of dispersion.

The abovementioned aqueous polymer dispersion was heated to 60° C., and feeds IV and V were added continuously at this temperature in the course of 2 hours. After the end of the feed, stirring was continued for a further hour at 60° C.

Feed IV: 9.1 g of water
  1.52 g of tert-butyl hydroperoxide
Feed V: 12.3 g of water
  1 g of sodium disulfite
  0.66 g of acetone After the end of the novel process, the aqueous polymer dispersion had a total residual monomer content well below 1% by weight, based on said dispersion. Of this, n-butyl acrylate accounted for 60 mg/kg of dispersion acrylic acid accounted for <10 mg/kg of dispersion acrylonitrile accounted for <10 mg/kg of dispersion styrene accounted for <10 mg/kg of dispersion.

We claim:

1. A process for the preparation of an aqueous polymer dispersion, in which an aqueous dispersion of a polymer which contains at least two monomers A and B which differ from one another, have at least one ethylenically unsaturated group and are incorporated in chemically bonded form is produced, in a manner known per se, so that the total content of monomers which are free, ie. not chemically bonded, and have at least one ethylenically unsaturated double bond in the aqueous polymer dispersion is from >0 to ≦1% by weight, based on the aqueous polymer dispersion, and this residual monomer content is then reduced by the action of a free radical redox initiator system comprising at least one oxidizing agent and at least one reducing agent, wherein the redox initiator system comprises, as the reducing agent, the adduct of a ketone of 3 to 8 carbon atoms with the bisulfite anion or the conjugated acid of this adduct.

2. A process as claimed in claim 1, wherein the dispersed polymer contains, incorporated in chemically bonded form, at least three monomers which differ from one another and have at least one ethylenically unsaturated group.

3. A process as claimed in claim 1, wherein the dispersed polymer contains, incorporated in chemically bonded form, at least four monomers which differ from one another and have at least one ethylenically unsaturated group.

4. A process as claimed in claim 1, wherein the dispersed polymer contains, incorporated in chemically bonded form, at least five monomers which differ from one another and have at least one ethylenically unsaturated group.

5. A process as claimed in claim 1, wherein the dispersed polymer contains, incorporated in chemically bonded form, at least six monomers which differ from one another and have at least one ethylenically unsaturated group.

6. A process as claimed in claim 1, wherein the ratio $S_A/S_B$ is ≧1.1, where $S_A$ is the molal solubility, to be determined at 55° C. and 1 bar, of that monomer of the residual monomer mixture whose content is to be reduced which has the highest molal solubility in water under these conditions and $S_B$ is the corresponding solubility of that monomer of the residual monomer mixture whose content is to be reduced which has the lowest molal solubility in water under these conditions.

7. A process as claimed in claim 1, wherein $S_A/S_B$ is $\geq 1.5$.

8. A process as claimed in claim 1, wherein $S_A/S_B$ is $\geq 5$.

9. A process as claimed in claim 1, wherein $S_A/S_B$ is $\geq 10$.

10. A process as claimed in claim 1, wherein $S_A/S_B$ is $\geq 50$.

11. A process as claimed in claim 1, wherein $S_A/S_B$ is $\geq 100$.

12. A process as claimed in claim 1, wherein $S_A/S_B$ is $\geq 1000$.

13. A process as claimed in claim 1, wherein $S_A/S_B$ is $\geq 100,000$.

14. A process as claimed in claim 1, wherein the residual monomer mixture whose content is to be reduced contains at least one of the monomers selected from the group consisting of styrene, butadiene, n-butyl acrylate and 2-ethylhexyl acrylate and at least one of the monomers selected from the group consisting of acrylic acid, methacrylic acid, acrylamide and methacrylamide.

15. A process as claimed in claim 1, wherein the residual monomer mixture whose content is to be reduced contains at least one of the monomers selected from the group consisting of methyl methacrylate, vinyl acetate and acrylonitrile and at least one of the monomers selected from the group consisting of acrylic acid, methacrylic acid, acrylamide and methacrylamide.

16. A process as claimed in claim 1, wherein the residual monomer mixture whose content is to be reduced comprises acrylonitrile.

17. A process as claimed in claim 1 and 16 and 17, wherein the residual monomer mixture whose content is to be reduced comprises acrylic acid.

18. A process as claimed in claim 1 and 16 to 19, wherein the residual monomer mixture whose content is to be reduced comprises acrylic acid and acrylonitrile.

19. A process as claimed in claim 1, wherein the solids volume content of the aqueous polymer dispersion produced in a manner known per se is from 10 to 50% by volume.

20. A process as claimed in claim 1, wherein the solids volume content of the aqueous polymer dispersion produced in a manner known per se is from 20 to 60% by volume.

21. A process as claimed in claim 1, wherein the solids volume content of the aqueous polymer dispersion produced in a manner known per se is from 30 to 70% by volume.

22. A process as claimed in claim 1, wherein the dispersed polymer contains from 0.1 to 5% by weight of acrylic acid incorporated in chemically bonded form.

23. A process as claimed in claim 1, wherein the dispersed polymer contains from 0.1 to 4% by weight of acrylic acid incorporated in chemically bonded form.

24. A process as claimed in claim 1, wherein the dispersed polymer contains from $\geq 5$ to 60% by weight of acrylic acid incorporated in chemically bonded form.

25. A process as claimed in claim 1, wherein the redox initiator system acts at a pH of the aqueous dispersing medium of from 2 to <7.

26. A process as claimed in claim 1, wherein the redox initiator system acts at a pH of the aqueous dispersing medium of from 2 to 6.

27. A process as claimed in claim 1, wherein the redox initiator system acts at a pH of the aqueous dispersing medium of from 2 to 5.

28. A process as claimed in claim 1, wherein the redox initiator system acts at from 20 to 65° C.

29. A process as claimed in claim 1, wherein the aqueous polymer dispersion produced in a manner known per se is a secondary dispersion.

30. A process as claimed in claim 1, wherein the preparation of the dispersed polymer of the aqueous polymer dispersion produced in a manner known per se and comprising at least one monomer having an ethylenically unsaturated group is carried out by the free radical aqueous emulsion polymerization method.

31. A process as claimed in claim 30, wherein the free radical aqueous emulsion polymerization is carried out by the feed method.

32. A process as claimed in claim 31, wherein from 50 to 100% by weight of the monomers to be polymerized are added to the polymerization vessel from the beginning of the free radical aqueous emulsion polymerization.

33. A process as claimed in claim 31, wherein from 80 to 100% by weight of the monomers to be polymerized are added to the polymerization vessel from the beginning of the free radical aqueous emulsion polymerization.

34. A process as claimed in claim 30, wherein the monomers to be added to the polymerization vessel from the beginning of the free radical aqueous emulsion polymerization are introduced continuously so that throughout the feed at least 80% by weight of the monomers added beforehand to the polymerization vessel have been incorporated by polymerization.

35. A process as claimed in claim 34, wherein throughout the continuous feed at least 90% by weight of the monomers added beforehand to the polymerization vessel have been incorporated by polymerization.

36. A process as claimed in claim 30, wherein the free radical initiator system used for the preparation of the dispersed polymer comprises peroxodisulfuric acid or an alkali metal salt thereof or an ammonium salt thereof.

37. A process as claimed in claim 30, wherein exclusively peroxodisulfuric acid or an alkali metal salt thereof or the ammonium salt thereof is used as the free radical initiator system for the preparation of the dispersed polymer.

38. A process as claimed in claim 30, wherein a polymerization temperature of from 70 to 100° C. is used for the preparation of the dispersed polymer.

39. A process as claimed in claim 30, wherein a polymerization temperature of from 80 to 100° C. is used for the preparation of the dispersed polymer.

40. A process as claimed in claim 30, wherein the monomer composition to be polymerized for the preparation of the dispersed polymer comprises at least two monomers which differ from one another and have at least one ethylenically unsaturated group and furthermore contains from 70 to 99.9% by weight of esters of acrylic and/or methacrylic acid of alkanols of 1 to 12 carbon atoms and/or styrene, or from 70 to 99.9% by weight of styrene and/or butadiene, or from 70 to 99.9% by weight of vinyl chloride and/or vinylidene chloride, or from 40 to 99.9% by weight of vinyl acetate, vinyl propionate and/or ethylene.

41. A process as claimed in claim 30, wherein the monomer composition to be polymerized for the preparation of the dispersed polymer comprises:

| | |
|---|---|
| from 0.1 to 5% by weight | of at least one α,β-mono-ethylenically unsaturated carboxylic acid of 3 to 6 carbon atoms and/or the amide thereof (monomers A) and |
| from 70 to 99.9% by weight | of esters of acrylic and/or methacrylic acid with alkanols of 1 to 12 carbon atoms and/or styrene (monomers B), |
| or | |
| from 0.1 to 5% by weight | of at least one α,β-mono-ethylenically unsaturated carboxylic acid of 3 to 6 carbon atoms and/or the amide thereof (monomers A) and |
| from 70 to 99.9% by weight | of styrene and/or butadiene (monomers B'), |
| or | |
| from 0.1 to 5% by weight | of at least one α,β-mono-ethylenically unsaturated carboxylic acid of 3 to 6 carbon atoms and/or the amide thereof (monomers A) and |
| from 70 to 99.9% by weight | of vinyl chloride and/or vinylidene chloride (monomers B"), |
| or | |
| from 0.1 to 5% by weight | of at least one α,β-mono-ethylenically unsaturated carboxylic acid of 3 to 6 carbon atoms and/or the amide thereof (monomers A) and |
| from 40 to 99.9% by weight | of vinyl acetate, vinyl propionate and/or ethylene (B'''). |

42. A process as claimed in claim 30, wherein the monomer composition to be polymerized for the preparation of the dispersed polymer comprises:

| | |
|---|---|
| from 0.1 to 30, preferably from 0.5 to 15, % by weight | of acrylonitrile and |
| from 70 to 99.9% by weight | of esters of acrylic or methacrylic acid with alkanols of 1 to 12 carbon atoms and/or styrene, |
| or | |
| from 0.1 to 30, preferably from 0.5 to 15,% by weight | of acrylonitrile and |
| from 70 to 99.9% by weight | of styrene or butadiene, |
| or | |
| from 0.1 to 40% by weight | of vinyl acetate or vinyl propionate and |
| from 60 to 99.9% by weight | of esters of acrylic or methacrylic acid with alkanols of 1 to 12 carbon atoms or styrene, |
| or | |
| from 0.1 to 5% by weight | of at least one α,β-mono-ethylenically unsaturated carboxylic acid of 3 to 6 carbon atoms or the amide thereof, in particular acrylic acid, |
| from 0.1 to 30, preferably from 0.5 to 15, % by weight | of acrylonitrile and |
| from 69.9 to 99.9% by weight | of esters of acrylic or methacrylic acid with alkanols of 1 to 12 carbon atoms or styrene |
| or | |
| from 0.1 to 5% by weight | of at least one α,β-mono-ethylenically unsaturated carboxylic acid of 3 to 6 carbon atoms or the amide thereof, in particular acrylic acid, |
| from 0.1 to 30, preferably from 0.5 to 15, % by weight | of acrylonitrile and |
| from 69.9 to 99.9% by weight | of styrene or butadiene, |
| or | |
| from 0.1 to 5% by weight | of at least one α,β-mono-ethylenically unsaturated carboxylic acid of 3 to 6 carbon atoms or the amide thereof, in particular acrylic acid, |
| from 0.1 to 40% by weight | of vinyl acetate or vinyl propionate and |
| from 59.9 to 99.9% by weight | of esters of acrylic or methacrylic acid with alkanols of 1 to 12 carbon atoms or styrene. |

43. A process as claimed in claim 1, wherein the ketone component of the adduct concomitantly to be used as a reducing agent has 3 to 5 carbon atoms.

44. A process as claimed in claim 1, wherein the ketone component of the adduct concomitantly to be used as the reducing agent is acetone, diethyl ketone and/or methyl ethyl ketone.

45. A process as claimed in claim 1, wherein the ketone component of the adduct concomitantly to be used as the reducing agent is acetone.

46. A process as claimed in claim 1, wherein exclusively the adduct of a ketone of 3 to 8 carbon atoms with the bisulfite anion and/or the conjugated acid thereof is used as the reducing agent of the free radical redox initiator system.

47. A process as claimed in claim 1, wherein exclusively the adduct of acetone with the bisulfite anion and/or the conjugated acid thereof is used as the reducing agent of the free radical redox initiator system.

48. A process as claimed in claim 1, wherein a peroxide and/or a hydroperoxide is concomitantly used as the oxidizing agent of the free radical redox initiator system.

49. A process as claimed in claim 1, wherein hydrogen peroxide, peroxodisulfuric acid, a salt of peroxodisulfuric acid, pinane hydroperoxide, tert-butyl hydroperoxide, dibenzoyl peroxide and/or cumyl hydroperoxide is concomitantly used as the oxidizing agent of the free radical redox initiator system.

50. A process as claimed in claim 1, wherein tert-butyl hydroperoxide is concomitantly used as an oxidizing agent of the free radical redox initiator system.

51. A process as claimed in claim 1, wherein the free radical redox initiator system contains the adduct of acetone with the bisulfite anion and/or the conjugated acid thereof as the reducing agent and tert-butyl hydroperoxide as the oxidizing agent.

52. A process as claimed in claim 1, wherein the free radical redox initiator system contains exclusively the adduct of acetone with the bisulfite anion and/or the conjugated acid thereof as the reducing agent and exclusively tert-butyl hydroperoxide as the oxidizing agent.

53. A process as claimed in claim 1, wherein the free radical redox initiator system also comprises a metal compound which is soluble in the aqueous reaction medium and whose metallic component may occur in a plurality of valency states.

54. A composition, comprising an adduct of a ketone of 3–8 carbon atoms with a bisulfite anion or a conjugated acid of this adduct and an aqueous polymer dispersion containing from >0 to ≧1% by weight, based on the aqueous polymer dispersion, of at least two residual monomers which differ from one another and have at least one ethylenically unsaturated double bond wherein said polymer is comprised of at least two monomeric units A and B which differ from one another.

55. A process for the preparation of an aqueous polymer dispersion, in which an aqueous dispersion of a polymer, which contains at least two monomers A and B, which differ from one another, have at least one ethylenically unsaturated group, and are incorporated in chemically bonded form is produced, in a manner known per se, so that the total content of monomers which are free, ie. not chemically bonded, and have a least one ethylenically unsaturated double bond in the aqueous polymer dispersion is from >0 to $\leq 0.5\%$ by weight, based on the aqueous polymer dispersion, and this residual monomer content is then reduced by the action of a free radical redox initiator system comprising at least one oxidizing agent and at least one reducing agent, wherein the redox initiator system comprises, as the reducing agent, the adduct of a ketone of 3 to 8 carbon atoms with the bisulfite anion or the conjugated acid of this adduct.

56. A process for the preparation of an aqueous polymer dispersion, in which an aqueous dispersion of a polymer, which contains at least two monomers A and B, which differ from one another, have at least one ethylenically unsaturated group, and are incorporated in chemically bonded form is produced, in a manner known per se, so that the total content of monomers which are free, ie. not chemically bonded, and have a least one ethylenically unsaturated double bond in the aqueous polymer dispersion is from >0 to $\leq 0.1\%$ by weight, based on the aqueous polymer dispersion, and this residual monomer content is then reduced by the action of a free radical redox initiator system comprising at least one oxidizing agent and at least one reducing agent, wherein the redox initiator system comprises, as the reducing agent, the adduct of a ketone of 3 to 8 carbon atoms with the bisulfite anion or the conjugated acid of this adduct.

* * * * *